Dec. 4, 1934.  A. WEILAND  1,983,259
CONTROL MECHANISM FOR VEHICLES
Filed May 6, 1932  2 Sheets-Sheet 1
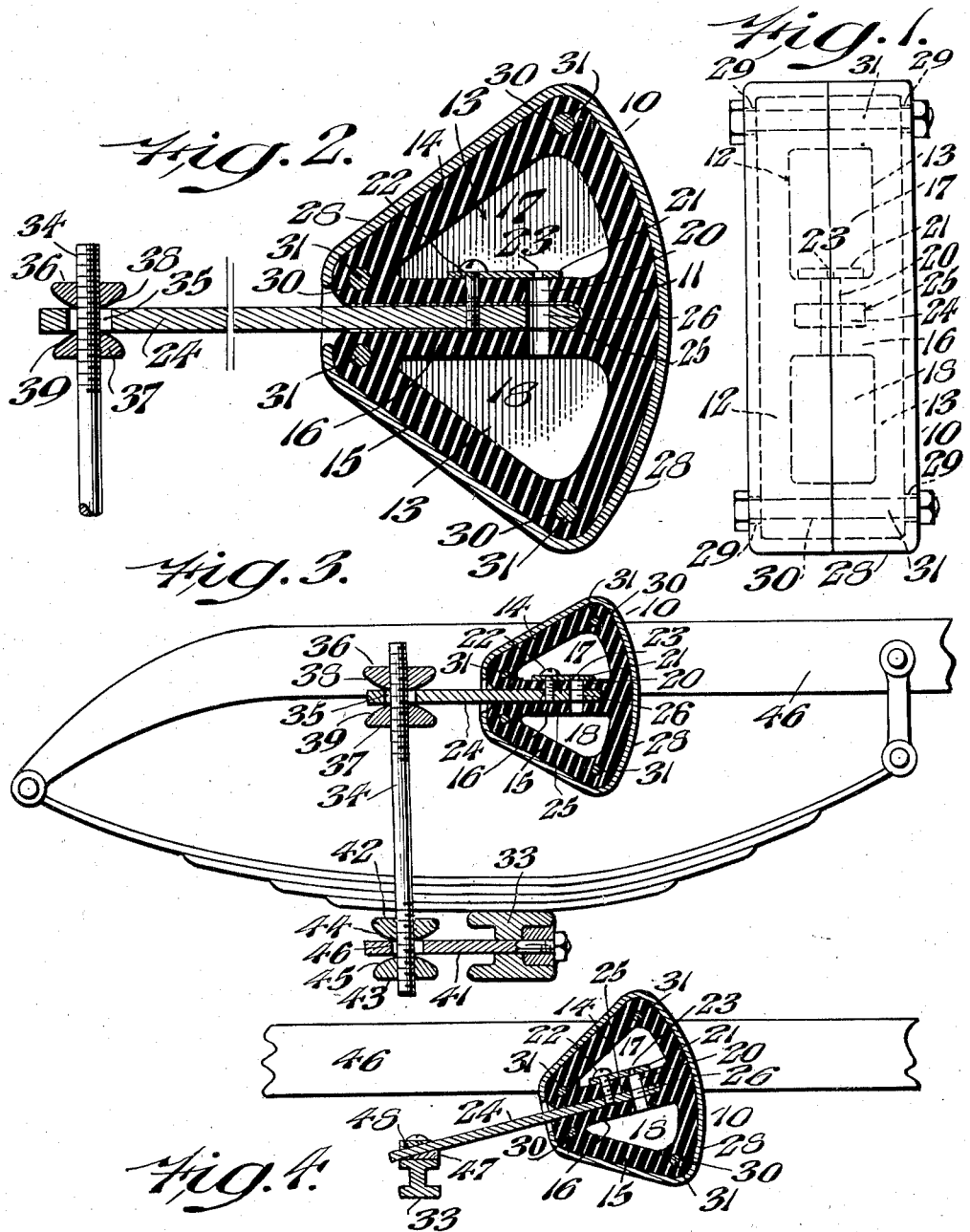
INVENTOR
ALFRED WEILAND
BY
Robert M. Barr
ATTORNEY Dec. 4, 1934.  A. WEILAND  1,983,259
CONTROL MECHANISM FOR VEHICLES
Filed May 6, 1932   2 Sheets—Sheet 2
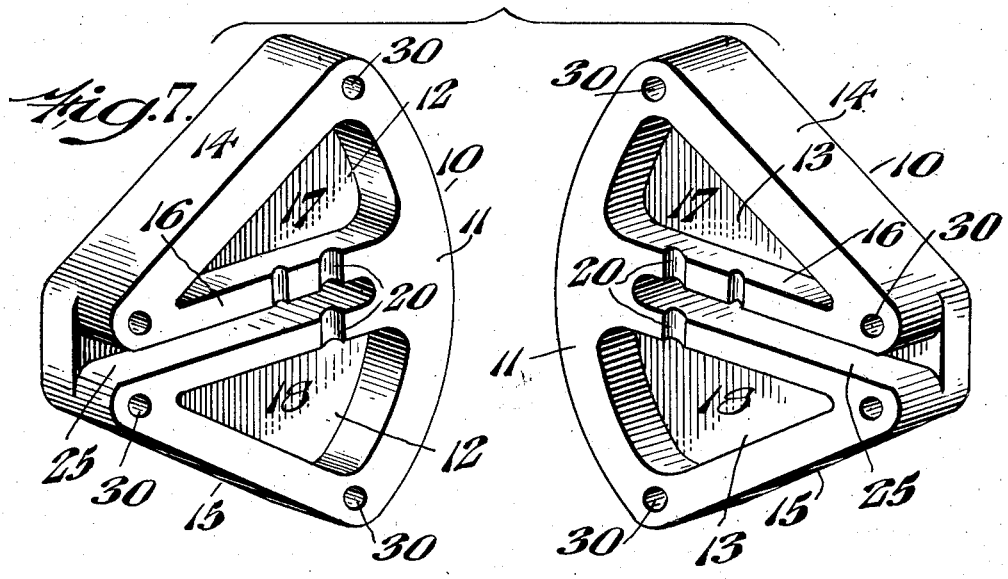
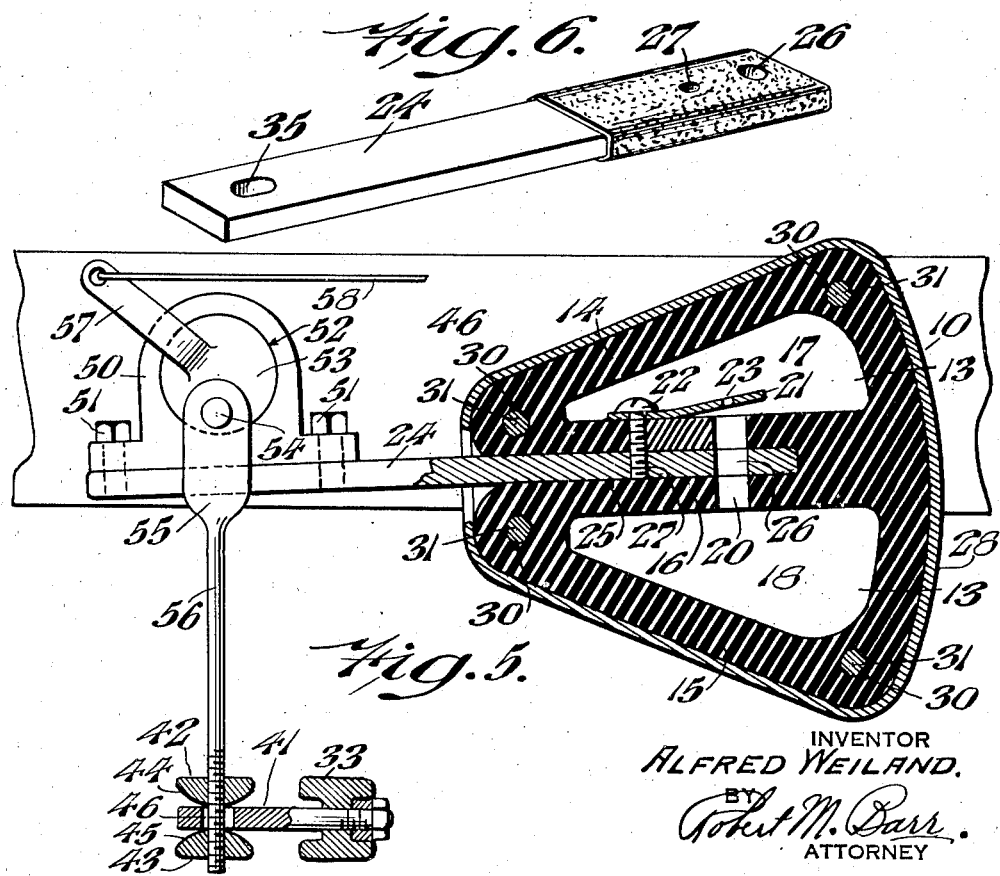
INVENTOR
ALFRED WEILAND.
BY
Robert M. Barr
ATTORNEY Patented Dec. 4, 1934

1,983,259

UNITED STATES PATENT OFFICE 1,983,259

CONTROL MECHANISM FOR VEHICLES

Alfred Weiland, Germantown, Pa.

Application May 6, 1932, Serial No. 609,647

5 Claims. (Cl. 267—35)

The present invention relates to devices for cushioning and otherwise minimizing the movement of a vehicle frame with respect to the axle of such vehicle, and more particularly to a device for both cushioning the initial impact and snubbing the resultant rebound.

In devices as heretofore constructed for shock absorbing purposes stress has been particularly laid upon checking the initial shock to the frame while the rebound has either been left to take care of itself or has been controlled in some degree by complicated mechanical structures such as cylinders and pistons with the necessary bearings and mounting equipment.

Some of the objects of the present invention are to provide an improved device for checking the movement of the frame of a vehicle relative to the axle thereof; to provide means for reducing the rebound of a spring supported body; to provide a device operating in one direction to cushion the shock of an impact received by the axles of a vehicle, and to snub or absorb the rebound resulting from such impact; to provide a shock control for vehicle frames which consists of few parts, is assembled as a unit, and operates effectively to cushion shock and rebound; to provide a device operating conjointly by expansion and compression to control the movement of one part with respect to another in both directions of movement; to provide a control device formed of metal and rubber, or rubber impregnated fabric, or the like, so associated as to avoid metal to metal contact while increasing the cushioning action of the device; to provide a control device which can be operated at will to vary the cushioning action whereby the device can be set to compensate for any given condition; to provide a control device which is so arranged and constructed that its effectiveness can be varied while the vehicle to which it is attached is in motion; to provide a method of making a cushioning device having a metal member molded therein to serve as an operating connection; to provide a method for uniting a metal part to a resilient part whereby the two parts are rendered for all intents and purposes an integral structure capable of resisting applied forces tending to wear one part loose from the other; and to provide other improvements as will hereinafter appear.

In the accompanying drawings Fig. 1 represents an end elevation of a control device embodying one form of the present invention; Fig. 2 represents a section of the same taken on line 2—2 of Fig. 1; Fig. 3 represents a side elevation of the device in one form of assembly between the frame and axle of a vehicle; Fig. 4 represents a side elevation of the device in another form of assembly between the frame and axle of a vehicle; Fig. 5 represents an elevation in part section of a modified form of the invention; Fig. 6 represents the operating arm as prepared for association with the resilient member at final molding; and Fig. 7 represents a step in the method of making the resilient member and showing the two sections as prepared for final molding.

Referring to the drawings one form of the present invention comprises a resilient member 10 preferably of rubber, or rubberized fabric, or any other suitable material, having the desired elasticity, and which is molded in the present instance so that it consists of a rear wall 11, substantially parallel sides 12 and 13, and converging top and bottom walls 14 and 15. Thus as will be seen from Fig. 2 the section through the body is generally approximately ovate in contour. The meeting ends of the top and bottom walls are joined to the rear wall 11 by a transverse web 16 which has a thickness somewhat greater than the thickness of the walls of the body 10 to serve as a partition dividing the body into two hollow parts which respectively bound air chambers 17 and 18.

For the purpose of permitting air to travel from one of the chambers 17 and 18 to the other, the web 16 is provided with a port 20 extending therethrough and having a sectional area sufficient to allow air to pass quickly from one chamber to the other. In other words the port 20 forms a communication between the chambers of such size as to allow the flow of air while giving an appreciable retarding effect. Since one of the features of the present invention is to counteract and cushion the rebound action of the device when in use, it is desirable to accomplish this end by restricting the flow of air from the chamber 17 to the chamber 18 and thus cause a building up of pressure in the chamber 17 to resist the applied force. As here shown this is accomplished by the provision of a flap valve 21 which is permanently held in position by means of a screw 22, or the like, so that its free end lies over the end of the port or passage 20. An orifice 23 of relatively small cross-sectional area is provided in the valve 21 at a point where it registers with the port 20 and hence the operation of the valve 21 is to open freely when air is pressed from the compartment 18 into the compartment 17, but closes when the flow is in the reverse direction so that the return of the air is retarded by reason of the small orifice 23.

In order to transmit movement due to road shocks, a bar 24 is provided, which is preferably in the form of a flat strip of steel and molded well into the web 16 so that an appreciable portion of its length is imbedded in the material of the body 10. It will be understood that in the molding of the body 10, the material is properly cored to form a slot 25 for the reception of the bar 24. Since the end of the bar 24 preferably passes across the port 20, a hole 26 corresponding in size to the sectional area of the port is arranged to register with the port 20 during assembly so as not to obstruct the proper functioning of the port. Also a threaded opening 27 is provided in the bar 24 for the purpose of receiving the screw 22 which mounts the valve 21 in position.

For encasing the body 10 to form a complete unit, a metal frame 28 is provided which is preferably cast in two parts, each of which has holes 29 located for matching relation with each other and with like holes 30 in the body 10 when the parts are to be assembled. Bolts 31 are arranged to respectively fasten the body 10 and frame 28 together ready for attachment to a part with which it is to function. The attaching means can be of any suitable construction which will effectively mount the unit, but in the preferred form consists of lugs 19 cast as an integral part of the frame and suitably apertured to receive fastening bolts as will be understood.

For connecting the free end of the bar 24 to the other part, such as the axle 33 of a vehicle, a rod 34 is provided preferably of steel having a threaded portion arranged to pass freely through a hole 35 which is properly located in the end of the bar 24. As here shown the rod 34 is connected to the bar 24 by nuts 36 and 37 which in assembled condition are at opposite sides of the bar 24. The nut 36 has a bearing face 38 of arcuate form engaging one side of the bar 24, while the nut 37 has a like bearing face 39, also of arcuate form to engage the opposite side of the bar 24. These curved faces 38 and 39 thus form rocking bearings which together with the oversize hole 35 permit sufficient play for the necessary coaction of the parts without binding or strain. The opposite end of the rod 34 is arranged to pass through an oversize hole 40 in the end of a fastening bolt 41 and to which it is connected by nuts 42 and 43 having arcuate bearing faces 44 and 45 respectively for clamping the bolt 41 between them but with provision for the necessary relative movement. The bolt 41 serves to anchor this end of the rod 34 to the axle 33 or other part having movement relative to the side frame member 46. Thus in Fig. 3 one form of assembly is shown wherein the device is associated with the springs 47 of the vehicle, though the effectiveness of the present device is such that the aforesaid springs may be eliminated and suitable distance rods used in place thereof.

In the form of the invention shown in Fig. 4 the device is shown as arranged as the direct support for the vehicle frame and with the ordinary vehicle springs dispensed with. Thus the cushioning unit is attached to the frame member 46 in such an angular position as will bring the free end of the bar 24 into close proximity to the axle 33 where means are provided for connecting it to have a slight relative movement. As here shown this means consists of a bearing block 47 bolted or otherwise made fast to the axle 33 and having a slot 48 therethrough for the snug reception of the bar 24.

In the form of the invention shown in Fig. 5 provision is made for varying the set relation of one part of the body 10 with respect to the other and this makes it possible to control the operation of the device while the vehicle is in motion to meet different road conditions. In this form of the device the bar 24 carries a bearing yoke 50 which as here shown is permanently attached thereto by stud-bolts 51 or any other suitable fastening means. This yoke is provided with a circular opening 52 forming a fixed bearing for an eccentric 53 which is attached by a pin or pivot member 54 to the forked end 55 of a rod 56, which latter serves the same purpose as rod 34 in the other forms of the invention for connecting the bar 24 to the axle 33 of the vehicle. Preferably the same threaded end and arcuate shaped nuts are also employed as heretofore explained for connecting the rod 56 to the bolt 41. In order to rotate the eccentric 53 at will a lever is provided in the form of an arm 57 having one end fast to the eccentric and its outer free end provided with a wire 58 or other connection leading to a convenient place in the vehicle adjacent to the operator. It will be evident in one position of the eccentric 53 that the bar 24 is in such a position as to cause the member 10 to remain in its normal molded condition with both of the chambers 17 and 18 practically neutral as to pressure. On the other hand if the eccentric 53 is rotated in one direction the angular relation of the bar 24 with respect to the member 10 is altered and one portion of the device 10 will be placed under compression while the other is under tension. Thus for example the eccentric 53 can be rotated in a direction to place the chamber 18 under tension while the chamber 17 is correspondingly placed under compression and in this way the entire relation of the two chamber air spaces as well as the loading on the vehicle springs or upon the device 10 can be changed at will to meet the desired condition.

The method of making the device of the present invention is new and original in that it consists of carrying out the molding and vulcanizing operation in two steps, one of which is an initial treatment which leaves the rubber or other impregnated fabric in a state of incomplete vulcanization. In other words this initial vulcanizing leaves the exterior surface of the incompleted molded article as a relatively soft mass, approximating the consistency of putty, which will readily merge into a like mass when the two are brought into contact. Thus in carrying out the method two oversize molds are formed, each preferably representing one-half of the cushioning element as cut in a plane which vertically intercepts the web 16. Each of these molds is filled with the material to be molded and then subjected to a curing operation for such a period of time as will leave the material in a semi-cured or semi-vulcanized condition. Also the bar 24 has that portion which is to fit within the slots 25 coated with the resilient material and given a semi-cure treatment. Thus as a result of this semi-cure, the two halves of the resilient member have taken on substantially the final shape but have an overall size about one-sixteenth of an inch larger than the final size, and each is open at one side allowing access to the air chamber and also exposing one-half of the slot 25 and screw hole so that the bar 24 can be then fitted into one-half of the slot 25 and the valve 21 permanently secured in place by threading the screw into the threaded hole of the bar 24. When this assembling has been done the semi-cured molded halves are fitted respectively into the two parts of the smaller final mold which owing to the larger semi-cured body would stand open about one-eighth of an inch. Where the joint is to be made rubber cement is then applied to the opposed faces of the body and the two parts of the mold brought together in face to face contact. Pressure is then applied to the mold through the application of a screw or hydraulic ram which closes the mold and places the rubber under pressure. This pressure upon the rubber material compresses the air trapped in the chambers of the body and this air assists in the proper vulcanization of the body when heat is applied. This trapping of the air is important as it is essential to have some internal pressure exerted against the rubber during the final vulcanizing step. As a result of this step the rubber or other material of the two half sections, as well as the rubber of the bar 24, have become an integral part and the device as removed from the molds is a complete unitary structure approximating ball form having two hollow chambers therein 17 and 18, spaced by the web 16, and having communication with each other by way of the valve controlled port 20. At the nose-like end of the completed member the operating bar 24 projects in a position for attachment to any associated part. In making this attachment it will be evident that the bearing nut construction upon the rod 34 permits a predetermined tensioning of the device when necessary for the particular requirements of use.

In the operation of the device of the present invention the frame 28 of the cushioning element is attached to one part such for example as the frame 26 of a vehicle while the projecting lever bar 24 is attached to the other part such as the axle of the vehicle. This latter connection is, as has been explained, made adjustable so that the lever bar 24 can be adjusted in a set position so that one of the air chambers of the resilient member is placed under compression while the other air chamber is maintained under tension. In this way the shock absorbing properties of the member can be varied to suit conditions and in the form of the invention shown in Fig. 5 these absorbing properties can be varied even while the vehicle is in motion. When an impact is received causing the axle 33 to move upward toward the frame 46 this motion will be transmitted by a rocking of the lever arm 24 which is in effect a pivotal action about the nose of the resilient member so that the chamber 18 is placed under compression and the chamber 17 under tension. The compressing of the chamber 18 causes the air to be expelled therefrom by way of the port 22 and since the flap valve 21 opens under this action the transfer of the air from one chamber to another will take place relatively quick. However, at the termination of the shock the rebound of the axle will be transmitted through a reverse rocking of the lever arm 24 and the chamber 17 will then be placed under compression while the chamber 18 will be under tension. The air, however, returns from the chamber 17 to the chamber 18 by way of the restricted orifice 23, so that a very definite damping action takes place which reduces the shock of rebound to a minimum. Through the use of the steel lever arm 24 together with the encased resilient member a complete unitary connection is provided which has sufficient stability and strength to serve as a sole support of one end of the frame of a vehicle and when so used the original spring can be dispensed with without loss of cushioning effect, ease of riding, or safety in operation.

While only three forms are shown in which this invention may be embodied, it is to be understood that the invention is not limited to any specific construction, but might be applied to various forms without departing from the spirit of the invention or the scope of the appended claims.

Having thus described my invention, I claim:

1. A device for controlling the movement of one part with respect to another part, comprising a resilient member having two communicating air chambers therein, means for attaching said member to one of said parts, a lever interposed between said chambers and projecting from said member, means to connect said lever to the other of said parts, whereby relative movement of said parts causes said lever to compress one or the other of said chambers in accordance with the direction of movement, and means to adjust said lever to a predetermined set position to initially hold one of said chambers under compression and the other of said chambers under tension.

2. A device for controlling the movement of the frame of a vehicle with respect to the axle of the vehicle, comprising a resilient member having two air chambers therein, and means operable at will for placing one of said chambers under compression and the other of said chambers under tension.

3. A device for controlling the movement of one part with respect to another part, comprising a resilient member having two communicating air chambers therein, means for attaching said member to one of said parts, a lever interposed between said chambers and projecting from said member, means to connect said lever to the other of said parts, and means for damping the action of said resilient member in one direction of movement of said lever.

4. A device for controlling the movement of one part with respect to another part, comprising a resilient member having two communicating air chambers therein, means for attaching said member to one of said parts, a lever interposed between said chambers and projecting from said member, means to connect said lever to the other of said parts, and means including an eccentric for damping the action of said resilient member in one direction of movement of said lever.

5. A device for controlling the movement of one part with respect to another part, comprising a resilient member having a chamber therein and a vent passage from said chamber, means for attaching said member to one of said parts, a rigid casing complemental in shape to said member fitted about said member and provided with an opening, a lever molded into said member at one side of said chamber and projecting from said member and through said opening, means to connect the projecting end of said lever to the other of said parts, and means for controlling said passage.

ALFRED WEILAND.